(12) United States Patent
Guyot et al.

(10) Patent No.: US 8,506,700 B2
(45) Date of Patent: Aug. 13, 2013

(54) DRY COMPOSITION COMPRISING A BINDER AND A SILICONE OIL

(75) Inventors: Christophe Guyot, Bois-Guillaume (FR); Laurent Guillot, Vernon (FR)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/217,705

(22) Filed: Aug. 25, 2011

(65) Prior Publication Data
US 2012/0037044 A1 Feb. 16, 2012

Related U.S. Application Data

(63) Continuation of application No. PCT/EP2010/052090, filed on Feb. 19, 2010.

(30) Foreign Application Priority Data

Feb. 26, 2009 (FR) ...................................... 0900884

(51) Int. Cl.
| | |
|---|---|
| *C08K 5/541* | (2006.01) |
| *C08K 5/5415* | (2006.01) |
| *C08K 5/5419* | (2006.01) |
| *C04B 24/24* | (2006.01) |
| *C04B 24/40* | (2006.01) |
| *C04B 26/02* | (2006.01) |
| *C04B 40/00* | (2006.01) |

(52) U.S. Cl.
USPC ............ 106/287.13; 106/287.14; 106/287.15; 106/287.16; 106/708; 106/724; 106/781; 106/795; 106/806; 524/261; 524/267

(58) Field of Classification Search
USPC ............ 106/287.13, 287.14, 287.15, 287.16, 106/724, 806, 708, 781, 795; 524/261, 267
See application file for complete search history.

(56) References Cited

U.S. PATENT DOCUMENTS

| | | | | |
|---|---|---|---|---|
| 5,766,323 | A * | 6/1998 | Butler et al. ...................... | 106/2 |
| 6,268,423 | B1 * | 7/2001 | Mayer et al. .................. | 524/492 |
| 6,464,776 | B1 | 10/2002 | Tsutsumi et al. | |
| 6,569,541 | B1 | 5/2003 | Martin et al. | |
| 7,410,538 | B2 * | 8/2008 | Butler et al. .................. | 106/806 |
| 2001/0011112 | A1 | 8/2001 | Langford | |
| 2001/0023653 | A1 | 9/2001 | Langford | |
| 2006/0230987 | A1 | 10/2006 | Burgals et al. | |
| 2008/0216715 | A1 | 9/2008 | Langford | |

FOREIGN PATENT DOCUMENTS

| | | | |
|---|---|---|---|
| EP | 1661874 A1 | | 5/2006 |
| FR | 2789679 A1 | | 8/2000 |
| JP | 6-122539 A | * | 5/1994 |
| JP | 8-59315 A | * | 3/1996 |
| WO | WO99/28264 A | * | 6/1999 |
| WO | WO 00/34200 A1 | | 6/2000 |
| WO | WO 2006/084588 A2 | | 8/2006 |
| WO | WO2008/062018 A1 | * | 5/2008 |

OTHER PUBLICATIONS

Bayer Silicones Baysilone ® Fluids M, Polymeric Dimethyl Siloxanes, Bayer AG Inorganics Business Group Silicones Business Unit Baysilone Marketing Section ((Jul. 1996).*
International Preliminary Report on Patentability issued in connection with PCT International Application No. PCT/EP2010/052090.
International Search Report (PCT/ISA/210) issued Mar. 22, 2010 for International Patent Application No. PCT/EP2010/052089.
Written Opinion (PCT/ISA/237) issued Mar. 22, 2010 for International Patent Application No. PCT/EP2010/052089.
International Preliminary Report on Patentability issued in connection with PCT International Application No. PCT/EP2010/052089.
International Search Report (PCT/ISA/210) issued on Mar. 26, 2010, by European Patent Office as the International Searching Authority for International Application No. PCT/EP2010/052090.
Written Opinion (PCT/ISA/237) issued on Mar. 26, 2010, by European Patent Office as the International Searching Authority for International Application No. PCT/EP2010/052090.
Clyde E. Stauffer, The Measurement of Surface Tension by the Pendant Drop Technique, The Procter and Gamble Company, Miami Valley Laboratories, Cincinnati, Ohio, vol. 69, No. 6, Jun. 1965, pp. 1933-1938.

* cited by examiner

*Primary Examiner* — Anthony J Green
(74) *Attorney, Agent, or Firm* — Buchanan Ingersoll & Rooney PC

(57) ABSTRACT

A dry composition including at least one binder and at least one silicone oil with the following formula (I):

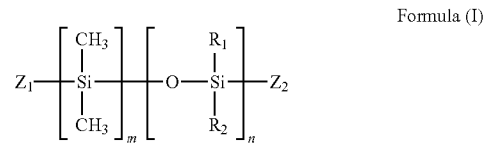

in which:

$Z_1$ and $Z_2$, identical or different, independently represent a terminal group selected from the group consisting of a hydrogen atom; a hydroxyl; a linear or branched, optionally substituted $C_1$ to $C_{12}$ alkyl; a linear or branched, optionally substituted $C_2$ to $C_{12}$ alkenyl radical; a linear or branched, optionally substituted $C_1$ to $C_{12}$ heteroalkyl; an optionally substituted $C_5$ to $C_{10}$ cycloalkyl radical; and an optionally substituted $C_6$ to $C_{18}$ aryl radical;

$R_1$ and $R_2$, identical or different, independently represent a hydrogen atom; a hydroxyl; a linear or branched, optionally substituted $C_1$ to $C_{12}$ alkyl; a linear or branched, optionally substituted $C_2$ to $C_{12}$ alkenyl radical; a linear or branched, optionally substituted $C_1$ to $C_{12}$ heteroalkyl; an optionally substituted $C_5$ to $C_{10}$ cycloalkyl radical; or an optionally substituted $C_6$ to $C_{18}$ aryl radical;

m and n, identical or different, independently represent a number ranging from 1 to 100.

22 Claims, 1 Drawing Sheet

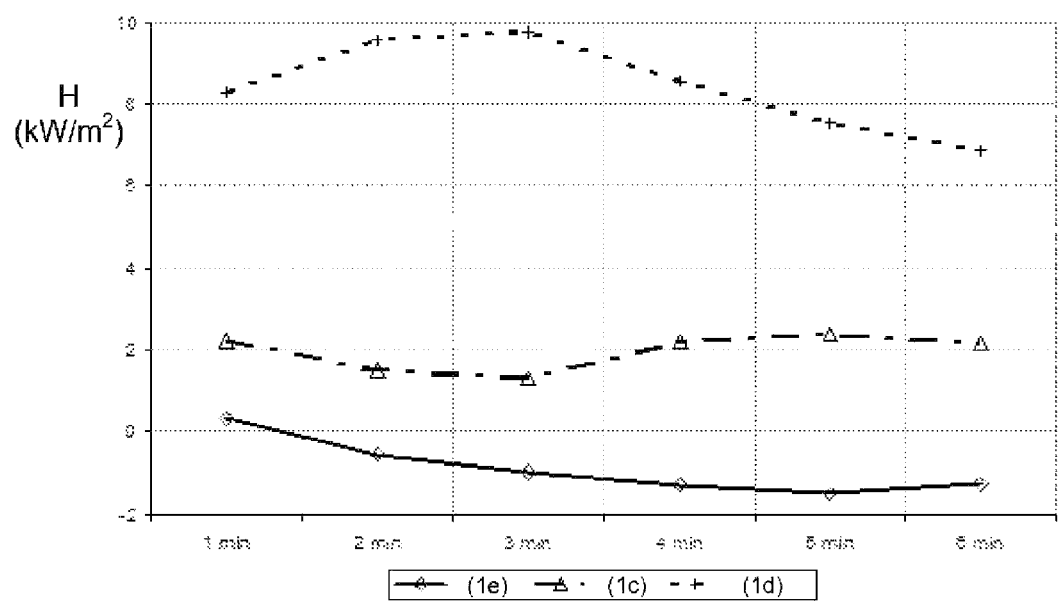

DRY COMPOSITION COMPRISING A BINDER AND A SILICONE OIL

RELATED APPLICATIONS

This application claims priority as a continuation application under 35 U.S.C. §120 to PCT/EP 2010/052090, which was filed as an International Application on Feb. 19, 2010 designating the U.S., and which claims priority to French Application 0900884 filed in France on Feb. 26, 2009. The entire contents of these applications are hereby incorporated by reference in their entireties.

FIELD

Disclosed is a dry composition comprising at least one binder and at least one silicone oil, which can enable a reduction in dust emission, as well as to a process of preparation same.

The composition can be used, for example, in the preparation of materials based on cement, such as mortars, concretes, plasters, etc.

BACKGROUND INFORMATION

Cement-based dry or ready-to-use compositions, for mortars or plasters, are generally in the form of powdered products and are known to have a high dust emission rate, for example during production, packaging or use thereof.

This dust emission presents health problems for workers and their working conditions.

In addition, the dust soils the local environment in which the materials are stored or handled (factory or construction site).

Moreover, the finest particles that escape more easily can be adjuvants or additives in small amounts. However, these constituents are costly and play an important role in the composition or in the properties of the end material. The loss of these constituents may modify the constitution of the composition and result in a loss in performance of the end material.

Furthermore, the fine particles of the compositions can be hygroscopic and/or electrostatic and can cause additional problems of implementation or use of the dry compositions, for example problems of fluidity, binding and risk of dust explosions.

To reduce dust emissions, "anti-dust" additives have been used in the formulation of compositions.

For example, reference can be made to U.S. Pat. No. 6,464,776, which describes the use of polytetrafluoroethylene for limiting the dust emission of cement or mortar compositions. However, these constituents promote the penetration of air in the composition, which alters the physicochemical properties of the material, resulting in the need to add additional defoaming additives.

International Publication No. WO 2006/084588 describes the use of hydrocarbon compounds such as additives for reducing the dust produced by dry compositions for construction. However, among the known additives, some are ineffective and large amounts of these additives are needed to obtain an "anti-dust" effect.

In addition, some additives are costly or need to be prepared by processes that are restrictive or difficult to implement.

Moreover, some additives can impair the properties and performances of mortars or concretes, and, for example, the workability, resistance, adhesion properties, waterproofing and durability properties.

Furthermore, the addition of "anti-dust" additives can impair the fire behavior of the materials (for example, mortars, concretes, plasters). The presence of "anti-dust" additives can impair the fire resistance of the composition.

Therefore, it would be beneficial to mitigate these defects and disadvantages of the related art. For example, it would be beneficial to provide dry compositions for cement-based materials making it possible to effectively limit dust emissions and loss during production, transport or handling, while also enabling the materials obtained to preserve good fire resistance properties. For example, it would be beneficial to provide inexpensive, practical and easy-to-use compositions with, for example, good properties of stability, fluidity, etc. In addition, it would be beneficial to provide dry compositions enabling end materials to be obtained having good physico-chemical properties, for example, workability, durability, compression strength, fire resistance, and so on.

SUMMARY

According to an exemplary embodiment, a dry composition is provided comprising at least one binder and at least one silicone oil with the following formula (I):

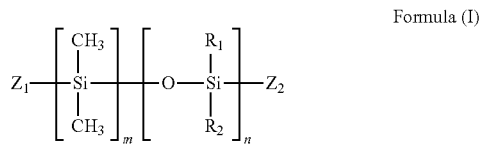

Formula (I)

in which:

$Z_1$ and $Z_2$, identical or different, independently represent a terminal group selected from the group consisting of a hydrogen atom; a hydroxyl; a linear or branched, optionally substituted $C_1$ to $C_{12}$ alkyl; a linear or branched, optionally substituted $C_2$ to $C_{12}$ alkenyl radical; a linear or branched, optionally substituted $C_1$ to $C_{12}$ heteroalkyl; an optionally substituted $C_5$ to $C_{10}$ cycloalkyl radical; and an optionally substituted $C_6$ to $C_{18}$ aryl radical;

$R_1$ and $R_2$, identical or different, independently represent a hydrogen atom; a hydroxyl; a linear or branched, optionally substituted $C_1$ to $C_{12}$ alkyl; a linear or branched, optionally substituted $C_2$ to $C_{12}$ alkenyl radical; a linear or branched, optionally substituted $C_1$ to $C_{12}$ heteroalkyl; an optionally substituted $C_5$ to $C_{10}$ cycloalkyl radical; or an optionally substituted $C_6$ to $C_{18}$ aryl radical;

m and n, identical or different, independently represent a number ranging from 1 to 100.

According to another exemplary embodiment, a process for preparing an exemplary composition is provided, the process comprising:

(i) preparing a mixture comprising at least one binder and/or at least one granular material and/or at least one additive; and (ii) adding at least one oil of formula (I) to the mixture.

According to another exemplary embodiment, a process for preparing an exemplary composition is provided, the process comprising mixing at least one oil of formula (I), at least one binder, and optionally at least one granular material and/or at least one additive.

According to another exemplary embodiment, a process for preparing an exemplary composition is provided, the process comprising:

(i) preparing a first mixture comprising at least one oil of formula (I) and at least one binder and/or at least one granular material and/or at least one additive;

(ii) preparing a second mixture comprising at least one binder and/or at least one granular material and/or at least one additive; and (iii) adding the first mixture to the second mixture.

According to another exemplary embodiment, a process for preparing a grout, a mortar, a concrete, a plaster, a parget and/or a screed is provided, the process comprising preparing a grout, a mortar, a concrete, a plaster, a parget and/or a screed with an exemplary composition.

BRIEF DESCRIPTION OF THE DRAWING

FIG. 1 shows exemplary heat release curves as a function of time. On the y-axis, "H" is expressed in kW/m². On the x-axis, time is expressed in minutes (min).

DETAILED DESCRIPTION

Disclosed is a dry composition comprising at least one binder and at least one silicone oil with the following formula (I):

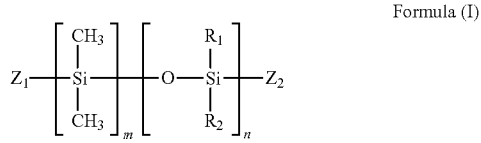

Formula (I)

in which:

$Z_1$ and $Z_2$, identical or different, independently represent a terminal group chosen from the group comprising a hydrogen atom, a hydroxyl, a $C_1$ to $C_{12}$ alkyl, linear or branched, optionally substituted, a $C_2$ to $C_{12}$ alkenyl radical, linear or branched, optionally substituted, a $C_1$ to $C_{12}$ heteroalkyl, linear or branched, optionally substituted, a $C_5$ to $C_{10}$ cycloalkyl radical, optionally substituted, and a $C_6$ to $C_{18}$ aryl radical, optionally substituted;

$R_1$ and $R_2$, identical or different, independently represent a hydrogen atom, a hydroxyl, a $C_1$ to $C_{12}$ alkyl, linear or branched, optionally substituted, a $C_2$ to $C_{12}$ alkenyl radical, linear or branched, optionally substituted, a $C_1$ to $C_{12}$ heteroalkyl, linear or branched, optionally substituted, a $C_5$ to $C_{10}$ cycloalkyl radical, optionally substituted, and a $C_6$ to $C_{18}$ aryl radical, optionally substituted;

m and n, identical or different, independently represent a number ranging from 1 to 100, for example 1 to 50, for example 1 to 30, for example 1 to 10.

In formula (I), $Z_1$ and $Z_2$ can be identical or different, with each of $Z_1$ and $Z_2$ independently representing a terminal group chosen from the group comprising:

a hydroxyl, a $C_1$ to $C_{12}$ alkyl, linear or branched, optionally substituted, a $C_2$ to $C_{12}$ alkenyl radical, linear or branched, optionally substituted, a $C_1$ to $C_{12}$ heteroalkyl, linear or branched, optionally substituted, a $C_5$ to $C_{10}$ cycloalkyl radical, optionally substituted, and a $C_6$ to $C_{18}$ aryl radical, optionally substituted;

a hydrogen atom, a hydroxyl, a $C_2$ to $C_{12}$ alkyl radical, linear or branched, optionally substituted, a $C_2$ to $C_{12}$ alkenyl radical, linear or branched, optionally substituted, a $C_1$ to $C_{12}$ heteroalkyl, linear or branched, optionally substituted, a $C_5$ to $C_{10}$ cycloalkyl radical, optionally substituted, and a $C_6$ to $C_{18}$ aryl radical, optionally substituted; or a hydroxyl, a $C_2$ to $C_{12}$ alkyl radical, linear or branched, optionally substituted, a $C_2$ to $C_{12}$ alkenyl radical, linear or branched, optionally substituted, a $C_1$ to $C_{12}$ heteroalkyl, linear or branched, optionally substituted, a $C_5$ to $C_{10}$ cycloalkyl radical, optionally substituted, and a $C_6$ to $C_{18}$ aryl radical, optionally substituted.

In formula (I), $R_1$ and $R_2$ can be identical or different, with each of $R_1$ and $R_2$ independently representing a terminal group chosen from the group comprising:

a hydroxyl, a $C_1$ to $C_{12}$ alkyl, linear or branched, optionally substituted, a $C_2$ to $C_{12}$ alkenyl radical, linear or branched, optionally substituted, a $C_1$ to $C_{12}$ heteroalkyl, linear or branched, optionally substituted, a $C_5$ to $C_{10}$ cycloalkyl radical, optionally substituted, and a $C_6$ to $C_{18}$ aryl radical, optionally substituted;

a hydrogen atom, a hydroxyl, a $C_2$ to $C_{12}$ alkyl radical, linear or branched, optionally substituted, a $C_2$ to $C_{12}$ alkenyl radical, linear or branched, optionally substituted, a $C_1$ to $C_{12}$ heteroalkyl, linear or branched, optionally substituted, a $C_5$ to $C_{10}$ cycloalkyl radical, optionally substituted, and a $C_6$ to $C_{18}$ aryl radical, optionally substituted; or a hydroxyl, a $C_2$ to $C_{12}$ alkyl radical, linear or branched, optionally substituted, a $C_2$ to $C_{12}$ alkenyl radical, linear or branched, optionally substituted, a $C_1$ to $C_{12}$ heteroalkyl, linear or branched, optionally substituted, a $C_5$ to $C_{10}$ cycloalkyl radical, optionally substituted, and a $C_6$ to $C_{18}$ aryl radical, optionally substituted.

As disclosed herein, the term "binder" can include a material which enables various elements to be bound together, such as sands, aggregates and granular materials. It can refer, for example, to inorganic binders (for example hydraulic binders) or organic binders (for example hydrocarbon binders).

As disclosed herein, the term "inorganic binder" can include a binder comprised of minerals that, when mixed with water, form a paste that hardens granular materials into an agglomerate. Among inorganic binders, it is possible to cite any binder known to a person skilled in the art, for example cement (aluminous, hydraulic, magnesite, metallurgical, supersulfated, nixed, slag, slag sand, fly ash, pozzolan, Portland, mixed Portland cement, etc.), lime (quicklime, sintered lime, carbonated lime, fluorspar, fat lime, lean lime, hydraulic lime, slaked lime, etc.), plaster, day, metakaolinite, etc.

As disclosed herein, the term "organic binder" can include a hydrocarbon binder, i.e., a binder based on hydrocarbons. Among the organic binders, it is possible to cite any binder known to a person skilled in the art, such as synthetic polymers.

Synthetic polymers can, for example, be in the form of a dry non-adhesive and/or redispersible powder. It can, for example, refer to thermoplastic polymers, thermosetting polymers, acrylic polymers, acrylic styrene polymers, epoxide polymers, polyurethane polymers, polymers based on ethylene, vinylene and/or vinyl acetate monomers, and polymers based on styrene and/or butadiene monomers.

According to an exemplary embodiment, the binder can be selected from the group comprising cement, lime, plaster, clay, synthetic polymers, for example as defined above, or a mixture of same.

According to another exemplary embodiment, the binder can be chosen from the group comprising cement, lime and synthetic polymers, for example as defined above, or a mixture of same.

As disclosed herein, the term "alkyl radical" can include a carbon radical, which can be linear, branched or cyclic, optionally substituted, comprising 1 to 12 carbon atoms, for example 1 to 10 carbon atoms, for example 1 to 8 carbon atoms.

As disclosed herein, the term "alkenyl radical" can include a carbon radical having at least one carbon-carbon double bond, which can be linear, branched or cyclic, optionally substituted, comprising 2 to 12 carbon atoms, for example 2 to 10 carbon atoms, for example 2 to 8 carbon atoms.

As disclosed herein, the term "heteroalkyl radical" can include an alkyl radical as defined above, in which said alkyl system includes at least one heteroatom, for example, chosen from the group comprising sulphur, oxygen, nitrogen or boron.

As disclosed herein, the term "aryl radical" can include a hydrocarbon radical comprising at least one ring satisfying the Hückel's aromaticity rule. Said aryl is optionally substituted and can include 6 to 18 carbon atoms, for example 6 to 10 carbon atoms.

As disclosed herein, the term "cycloalkyl" can include a cyclic carbon radical, saturated or unsaturated, optionally substituted, which can include 5 to 10 carbon atoms.

The term "substituted", for example, can refer to the replacement of a hydrogen atom in a given structure by a radical chosen from the group comprising, for example, an alkyl, an alkenyl, a heteroalkyl, an aryl, a heteroaryl, a hydroxyl, an amine, a halogen, a haloalkyl, etc. When more than one position can be substituted, the substituents can be the same or different in each position.

As disclosed herein, the term "haloalkyl" can include an alkyl radical as defined above, in which said alkyl system includes at least one halogen.

According to an exemplary embodiment, the silicone oil of formula (I) can include an oil of formula (I) or it can be in the form of a mixture of different silicone oils of formula (I).

The silicone oil can, for example, be a silicone polymer, for example, polydimethylsiloxane.

As an example, it is possible to cite commercial silicone oils such as, for example, Dow Corning oils (registered trademark), for example Dow Corning 200R Fluid 1 CST, Dow Corning 200R Fluid 5 CST, Dow Corning 200R Fluid 10 CST, Dow Corning 200R Fluid 20 CST, available from the Dow Corning company (Belgium).

It was surprisingly observed that the presence of silicone oil in an exemplary composition, for example, does not impair the fire resistance of the materials comprising them.

An exemplary composition can be in powder form. The powder particles can, for example, have a diameter of up to 10 mm, for example 0.001 to 10 mm, for example 0.01 to 5 mm, for example 0.1 to 1 mm. For example, an exemplary composition can include powder particles of which more than 50% of the particles have a diameter ranging from 0.001 to 10 mm.

The oil can have a surface tension of less than 60 mN/m, for example less than 45 mN/m. According to an exemplary embodiment, the oil can have a surface tension of less than 35 mN/m.

As disclosed herein, the term "surface tension" refers to the tension at the separation surface between the oil and the powder particles (solids). The surface tension makes it possible to characterize the ability of the oil to wet the surface of the powder particles. According to the Young-Dupré equation, the oil more easily wets the solid particles when the surface tension is lower than that of the solid particles.

The surface tension of the oil can, for example, be determined by the pendant drop method. See, for example, STAUFFER(C. E.)—The measurement of the surface tension by the pendant drop technique. J. Phys. Chem. 69, 1965, pages 1933-8.

In an exemplary embodiment, the oil can have a dynamic viscosity of below 1 Pa·s at 20° C., for example from 0.001 to 0.08 Pa·s at 20° C., and for example from 0.001 to 0.05 Pa·s at 20° C.

As disclosed herein, the term "dynamic viscosity" refers to the physical property of the oil that characterizes the stress produced by a shear force in the oil.

The dynamic viscosity of the oil can, for example, be determined by the method of standard NF EN ISO 2555 or ISO 3104.

According to an exemplary embodiment, the oil can have a surface tension of below 45 mN/m and a dynamic viscosity of below 0.1 Pa·s at 20° C.

The dust of which the emission is to be limited or reduced, can include fine (lightweight) particles contained in the dry composition. It has very surprisingly been observed that a suitable choice for the surface tension and the viscosity of the oil can, for example, make it possible to improve the anti-dust effect of the composition. Indeed, a suitable choice for these parameters can, for example, make it possible to reduce the emission and loss of fine particles in the form of dust while reducing or preventing the formation of undesirable agglomerates (for example, agglomeration with large particles capable of hindering the implementation of the dry composition and the performance thereof (for example, its fluidity, bonding properties) and/or the performance of mortars or materials obtained from the dry composition (for example, workability, mechanical strength, adhesion). The term "fine particles" refers to particles having a diameter smaller than 50 μm, for example smaller than 32 μm. The term "large particles" refers to particles having a diameter larger than 50 μm.

According to an exemplary embodiment, the silicone oil content in the composition can be 0.05 to 5% by weight of the composition, for example 0.1 to 5%, for example 0.1 to 1% and for example 0.2 to 1%.

The composition can have a binder content ranging from 5 to 95% by weight of the composition, for example 10 to 80%, and for example 15 to 50%.

According to an exemplary embodiment, the composition can also include at least one granulate chosen from the group comprising sand, stone dust, ground brick, gravel, grits, alumina, bauxite, calcined bauxite, crushed flint, or any natural or synthetic granular material (for example, wood, rubber, polystyrene). A person skilled in the art will be capable of choosing the granular material to be used according to the intended use.

For example, the composition may have a granular material content of 5 to 95% by weight of the composition, for example 20 to 90%, and for example 50 to 85%.

The term "granular material" can include a solid particle or an aggregate of solid particles of natural or synthetic origin, intended to be used in the composition of materials intended for construction, buildings, and civil engineering productions. The granular material can have a diameter ranging from 1 μm to 10 mm, for example from 100 μm to 10 mm. Among the granular materials that can be used, it is possible to cite, for example, stones, gravel (having a particle size of 2 to 10 mm), coarse sand (having a particle size of 0.5 to 2 mm), fine sand (having a particle size of 100 to 500 μm), silt, filler, and so on.

The term "filler" can include a fine granular material, having, for example, a particle size smaller than 125 p.m.

According to an exemplary embodiment, the granular material can be a siliceous, limestone, silico-limestone, aluminous or silico-aluminous granular material.

According to an exemplary embodiment, the composition can also include an additive chosen from the group comprising fly ash, a water repellent or waterproofing agent, a carboxylic acid salt, a resin, a retarding adjuvant, an accelerating adjuvant, an air-entraining adjuvant, a defoaming agent, a rheology modifying agent, and any other adjuvant or additive capable of being used that is known to a person skilled in the art. A person skilled in the art will be capable of choosing the additive according to the targeted use. These additives can advantageously be in the form of a powder or in a form compatible with their introduction in a dry composition.

The term "additive" can include a constituent or product added to a composition and making it possible to provide said composition with particular characteristics and properties, for example, making it possible to modify the setting time of the material, the preservation, to modify the viscosity, workability, to improve the mechanical strength, the waterproofness, and to reduce or prevent the growth of microorganisms.

Among the air-entraining agents and defoaming agents, it is possible to cite, for example, a detergent, a wetting agent, a dispersing agent, and an emulsifier. For example, it can include anionic surfactants, cationic surfactants, zwitterionic or amphoteric surfactants, non-ionic surfactants (for example a saccharose ester, sorbitol, a polyethylene glycol ester, a fatty add ester, an ethoxylate or any other non-ionic surfactant described, for example, in the patent application EP 1 661 874).

Among the water repellent or waterproofing agents, it is possible to cite, for example, a fatty add ester, a silicone derivative, or a PTFE (polytetrafluoroethylene) derivative.

Among the carboxylic acid salts, it is possible to cite, for example, a calcium carboxylate, for example calcium formate.

Among the resins, it is possible to cite, for example, an amino resin derived from urea (for example, melamine).

Among the retarding adjuvants (compound having a retarding effect on the setting of the cements, mortars or other materials), it is possible to cite, for example, gluconates, citric acid, tartric acid, salts thereof, aminoplastic resins or other retarding adjuvants described, for example, in the patent application EP 1 661 874.

Among the accelerating agents, it is possible to cite, for example, formate, thiocyanate, nitrate, NaCl, $CaCl_2$, aluminum hydroxide, alumina, triethanol amine, and tri-isopropanol amine salts.

Among the rheology modifiers, it is possible to cite, for example, cellulose ethers, gums (for example, xanthan, guar, gelane, etc.), starches, starch ethers, polyvinyl alcohol, water-soluble polyacrylates, colloidal silica, polymers or copolymers (an acetate-versatate copolymer, a styrene-acrylic copolymer, a polyvinyl acetate polymer, an acrylic copolymer, an ethylene-vinylene-acetate terpolymer), as well as fluidizing agents such as melamine and derivatives thereof, polynaphthalene and derivatives thereof, polycarboxylates, and casein.

The total additive content in the composition can be from 0.01 to 20% by total weight of the composition, for example 0.05 to 15%, and for example 0.1 to 10%.

According to an exemplary embodiment, the composition can include:
at least one oil of formula (I) with a total oil content of 0.05 to 5% by weight of the composition,
at least one binder with a total binder content of 5 to 95% by weight of the composition,
at least one granular material with a total granular material content of 5 to 95% by weight of the composition, and
at least one additive with a total additive content of 0.01 to 20% by weight of the composition.

According to an exemplary embodiment, a process for preparing a composition is provided, in which:
(i) a mixture comprising at least one binder and/or at least one granular material and/or at least one additive is prepared;
(ii) at least one oil of formula (I) is added to the mixture obtained in (i).

According to an exemplary embodiment, a process for preparing a composition is provided in which a mixture comprising at least one oil of formula (I), at least one binder, and optionally at least one granular material and/or at least one additive is prepared.

According to an exemplary embodiment, a process for preparing a composition is provided in which:
(i) a mixture comprising at least one oil of formula (I) and at least one binder and/or at least one granular material and/or at least one additive is prepared;
(ii) a mixture comprising at least one binder and/or at least one granular material and/or at least one additive is prepared;
(iii) the mixture obtained in (i) is added to the mixture obtained in (ii).

According to an exemplary embodiment, provided is the use of a composition for the preparation of a grout, a mortar, a concrete, a plaster, a parget and/or a screed.

According to an exemplary embodiment, provided is the use of a composition for the construction, building, repair of concretes, protection of concretes and steels from adverse weather conditions, external stress or fire, waterproofing, anchoring, chocking, sealing, bonding of tiles or flooring, and facade coverings.

Other advantages may also appear to a person skilled in the art upon reading the following examples, illustrated with the appended figures, provided for illustrative purposes.

EXAMPLES

In the following examples, the "anti-dust" agent refers to the oil of formula (I).

Example 1

Compositions (1a), (1b) and (1c)

Compositions (1a), (1b) and (1c) are dry compositions for a motor of which the constituent contents are provided in table 1 below (in % by total weight of the dry composition):

TABLE 1

| Example of composition | |
|---|---|
| Cement (CEM Cement I 52.5R CE sold by the Calcia company, France) | 24.8% |
| Siliceous sand (SB sand said by the Fulchiron company, France) | 74.5% |
| "Anti-dust" agent | 0.7% |

The three compositions (1a), (1b) and (1c) have been produced with the proportions indicated above, and with the following silicone oils as the "anti-dust" agent:
composition (1a) comprising 07% PDMS (polydimethylsiloxane) Dow Corning 200R 5 CST silicone oil sold by the Dow Corning company (Belgium);
composition (1b) comprising 07% PDMS (polydimethylsiloxane) Dow Corning 200R 10 CST silicone oil sold by the Dow Corning company (Belgium);

composition (1c) comprising 0.7% PDMS (polydimethylsiloxane) Dow Corning 200R 20 CST silicone oil sold by the Dow Corning company (Belgium).

The characteristics of the silicone oils, used as an "anti-dust" agent in compositions (1a), (1b) and (1c), are provided in table 2 below:

TABLE 2

Characteristics of the silicone oils in the compositions

|  | Dow Corning 200 R 5 CST | Dow Corning 200 R 10 CST | Dow Cornimg 200 R 20 CST |
|---|---|---|---|
| viscosity at 20° C. (in Pa · s) | 0.007 | 0.013 | 0.025 |
| surface tension (in mN/m) | 18 | 19 | 19 |

Procedure

Compositions (1a), (1b) and (1c) were prepared as follows:
(i) the sand, filler, cement and adjuvants were mixed;
(ii) the anti-dust agent was added to the above mixture and everything was mixed.

Example 2

Measurement of the "Anti-Dust" Effect of Exemplary Compositions and Comparative Examples Four compositions (1a), (1b), (1c) and (1d) were produced with different "anti-dust" agents as well as a composition (1e), or "control" composition, not comprising an "anti-dust" agent, as described below:
composition (1a) comprising 07% PDMS (polydimethylsiloxane) Dow Corning 200R 5 CST silicone oil sold by the Dow Corning company (Belgium);
composition (1b) comprising 07% PDMS (polydimethylsiloxane) Dow Corning 200R 10 CST silicone oil sold by the Dow Corning company (Belgium);
composition (1c) comprising 07% PDMS (polydimethylsiloxane) Dow Corning 200R 20 CST silicone oil sold by the Dow Corning company (Belgium);
composition (1d) (prepared according to the procedure of example 1) comprising 07% mineral oil (paraffin oil sold under the trade name Shell Catanex H713 by the SHELL company, France),
composition (1e) (prepared according to the procedure of example 1) not comprising an "anti-dust" agent.

The test performed in order to measure the dust emission of a motor consists of filling a 100 ml flask with 65 g of dry mortar and manually shaking the closed flask 10 times. Once the agitation is stopped, the flask is quickly opened. The dust emission is then evaluated by the dust that separates from the opening of the flask. The dust emission is classified on a scale of 1 to 4 (1 corresponding to a very low dust emission and 4 corresponding to a very high dust emission).

The results obtained are indicated in the following table 3:

TABLE 3

Comparison of the dust emission

| Composition | (1a) (DC 5) | (1b) (DC 10) | (1c) (DC 20) | (1d) (mineral oil) | (1e) (control) |
|---|---|---|---|---|---|
| Dust emission | 1 | 1 | 1 | 1 | 4 |

The results show that exemplary compositions (1a), (1b) and (1c) include a silicone oil making it possible to obtain a significant reduction in dust emission with respect to the control composition.

It has been observed that the reduction in the dust emission for exemplary compositions (1a), (1b) and (1c) is comparable to that of composition (1d), which includes a mineral oil as the "anti-dust" agent.

Example 3

Evaluation of Performance of Mortars Produced Using the Compositions

For these tests, the five compositions prepared according to example 3.a) were evaluated and compared.

These performance tests were performed on the hardened mortars prepared using dry mortar compositions (1a), (1b), (1c) and (1d) to which water was added in an amount of 12.5% by total weight of dry powder. The mortar samples were evaluated after 28 days of hardening.

The following tests were performed:
compression strength test (measurement performed according to the test standard EN 12190);
bending strength test (measurement performed according to the test standard EN 12190);
adhesion test (measurement performed according to the test standard EN 1542);
withdrawal test (measurement performed according to the test standard EN 12617-4).

The results of these tests are presented in table 4 below:

TABLE 4

Comparison of mortar performances

| Composition | (1a) (DC 5) | (1b) (DC 10) | (1c) (DC 20) | (1d) (mineral oil) | (1e) (control) |
|---|---|---|---|---|---|
| Compression strength at 28 days (MPa) | 40 | 41 | 41 | 45 | 49 |
| Bending strength at 28 days (MPa) | 7.5 | 7.5 | 8.1 | 8.1 | 8 |
| Adhesion at 28 days (MPa) | 1.1 | 1.05 | 1.1 | 1.05 | 1.0 |
| Free shrinkage at 28 days (μm/m) | −1100 | −1160 | −1150 | −1200 | −1450 |

These results show that the mortars obtained with exemplary compositions (compositions (1a), (1b) and (1c)) have very good performances. In particular, the compression strength properties, as well as the adhesion and free shrinkage properties are not impaired with respect to the mortar obtained from the control composition (1e) and are comparable to those of composition (1d). It was surprisingly observed that the free shrinkage properties of the compositions are improved with respect to the control composition (1e) and the composition (1d) comprising mineral oil.

Thus, while enabling a significant reduction in dust emission, the compositions comprising silicone oil make it possible to maintain very good performances, comparable to the control composition (not comprising an "anti-dust" additive), but also have the advantage of maintaining very good fire resistance properties (as described in example 4 below).

Example 4

Evaluation of Anti-Fire Properties of the Mortars Obtained Using Compositions For these tests, the fire resistance characteristics of the five compositions prepared in example 2 were evaluated and compared.

These fire resistance tests were performed on hardened mortars prepared using dry mortar compositions (1a), (1b), (1c) and (1d) to which water was added in an amount of 12.5% by total weight of dry powder. The mortar samples were evaluated after 28 days of hardening.

The fire resistance tests conducted are performed according to standard ISO 5660-1. They are conducted with a calorimetric cone with a power of 75 kW/m² (corresponding to a temperature on the order of 880° C.).

The mortar samples obtained after hardening of compositions (1a), (1b), (1c) and (1d) were crushed (into particles from 1 mm to 3 mm in diameter) before being tested.

Different parameters are measured during the test that lasts 460 seconds (exposure of the sample for said 460 seconds to a heat source releasing 75 kW/m²):

flame duration (in s): duration of the presence of flames at the surface of the sample during the test;

peak heat release (kW/m²): maximum value of heat released during the test;

total heat released (MJ/m²): sum of the energy released for the entire duration of the test;

MARHE (Maximum Average Rate of Heat Emission) (kW/m²): maximum value of the flow of heat emitted.

The results obtained are presented in table 5 below;

TABLE 5

Comparison of fire behavior

| Composition | (1c) (DC 20) | (1d) (mineral oil) | (1e) (control) |
|---|---|---|---|
| flame duration (in s) | 0 | 220 | 0 |
| peak heat release (kW/m²) | 9.0 | 14.8 | 2.5 |
| total heat released (MJ/m²) | 0.9 | 27 | 0.1 |
| MARHE (kW/m²) | 4.0 | 9.5 | 1.1 |

These results show that exemplary composition (1c) (comprising PDMS silicone oil) makes it possible to significantly improve the fire resistance of the mortar with respect to composition (1d) comprising mineral oil. For example, there is no persistence of flame (zero flame persistence duration). Moreover, the heat released, according to the three parameters measured, is lower than in the case of composition (1d).

Thus, while enabling a reduction in dust emission, exemplary compositions comprising silicone oil make it possible to preserve very good fire resistance properties, comparable to compositions not comprising an "anti-dust" additive (control composition (1e)).

In calorimetric cone tests, the amount of heat released over time by the mortar sample exposed to the heat source (75 kW/m²) was also measured. The results obtained are presented in the curve provided in FIG. 1, and showing the change in the amount of heat released (H in kW/m²) as a function of time (in minutes).

In the case of the composition comprising silicone oil, the curve is clearly inferior to that of the composition containing mineral oil. Moreover, it remains relatively close to the curve showing the "control" composition (composition (1e)).

Again, these tests show that the addition of PDMS silicone oil makes it possible both to improve the fire resistance of the mortar (fire resistance comparable to that of the control) and to reduce the dust emission (reduction comparable to that obtained with a mineral oil).

Example 5

Measurement of the "Anti-Dust" Effect

The following compositions were prepared:

exemplary composition (1a) comprising 0.7% PDMS Dow Corning 200 R 5 CST silicone oil, prepared according to the procedure of example 1;

control composition (1e) not comprising an "anti-dust" agent (according to the procedure of example 1);

composition (1f) prepared by sieving of the control composition (1e), removing particles with a diameter smaller than 32 μm.

The dust emission of each of these three compositions was measured according to the test described in example 2. The results are presented in table 6 below:

TABLE 6

Characteristics of the "anti-dust" effect

| Composition | (1a) (DC 5) | (1e) (control) | (1f) (control sieved at 32 μm) |
|---|---|---|---|
| Dust emission | 1 | 4 | 1 |

As already observed in example 2, exemplary composition (1a) enables a significant reduction in the dust emission compared to the control composition (1e) not comprising an "anti-dust" agent.

In addition, these results show that exemplary composition (1a) has a reduction in dust emission comparable to that of composition (1f) from which the particles with a diameter smaller than 32 μm were removed by sieving.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A process for preparing a dry composition, the process comprising:

(i) preparing a first mixture comprising at least one silicone oil of formula (I), wherein the first mixture further comprises at least one binder and/or at least one granular material and/or at least one additive:

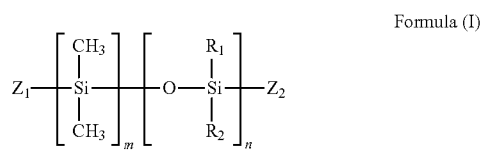

Formula (I)

in which:
- $Z_1$ and $Z_2$, identical or different, independently represent a terminal group selected from the group consisting of a hydrogen atom; a hydroxyl; a linear or branched, optionally substituted $C_1$ to $C_{12}$ alkyl; a linear or branched, optionally substituted $C_2$ to $C_{12}$ alkenyl radical; a linear or branched, optionally substituted $C_1$ to $C_{12}$ heteroalkyl; an optionally substituted $C_5$ to $C_{10}$ cycloalkyl radical; and an optionally substituted $C_6$ to $C_{18}$ aryl radical;
- $R_1$ and $R_2$, identical or different, independently represent a hydrogen atom; a hydroxyl; a linear or branched, optionally substituted $C_1$ to $C_{12}$ alkyl; a linear or branched, optionally substituted $C_2$ to $C_{12}$ alkenyl radical; a linear or branched, optionally substituted $C_1$ to $C_{12}$ heteroalkyl; an optionally substituted $C_5$ to $C_{10}$ cycloalkyl radical; or an optionally substituted $C_6$ to $C_{18}$ aryl radical;
- m and n, identical or different, independently represent a number ranging from 1 to 100;
- (ii) preparing a second mixture comprising at least one binder and/or at least one granular material and/or at least one additive; and
- (iii) adding the first mixture to the second mixture,
- wherein at least one of the first mixture and the second mixture comprises at least one binder,
- wherein the dry composition comprises at least one binder and at least one silicone oil of formula (I),
- wherein the content of the at least one silicone oil of formula (I) is 0.05 to 5% by weight of the composition.

2. The process according to claim 1, wherein the composition is in the form of a powder.

3. The process according to claim 1, wherein the oil has a surface tension of below 60 mN/m.

4. The process according to claim 1, wherein the silicone oil has a dynamic viscosity of less than 0.1 Pa·s at 20° C.

5. The process according to claim 1, wherein the binder of the composition is selected from the group consisting of a cement, lime, plaster, clay, synthetic polymers, and a mixture of same.

6. The process according to claim 1, wherein the binder of the composition is selected from the group consisting of a cement, lime, synthetic polymers, and a mixture of same.

7. The process according to claim 1, wherein the binder content is 5 to 95% by weight of the composition.

8. The process according to claim 1, wherein the composition further comprises at least one granular material selected from the group consisting of a sand, stone dust, ground brick, gravel, grits, alumina, bauxite, calcined bauxite, crushed flint, and a natural or synthetic granular material.

9. The process according to claim 8, wherein the granular material content is 5 to 95% by weight of the composition.

10. The process according to claim 8, wherein the granular material is siliceous, limestone, silico-limestone, aluminous or silico-aluminous granular material.

11. The process according to claim 1, wherein the composition further comprises an additive selected from the group consisting of a water repellent or waterproofing agent, a carboxylic acid salt, a resin, a retarding adjuvant, an accelerating adjuvant, an air-entraining adjuvant, a defoaming agent and a rheology modifying agent.

12. The process according to claim 1, wherein the composition is suitable for use in at least one of construction, building, repair of concretes, protection of concretes and steels from adverse weather conditions, external stress or fire, waterproofing, anchoring, chocking, sealing, bonding of tiles or flooring, and facade coverings.

13. The process according to claim 2, wherein the oil has a surface tension of below 60 mN/m.

14. The process according to claim 2, wherein the silicone oil has a dynamic viscosity of less than 0.1 Pa·s at 20° C.

15. The process according to claim 1, wherein the binder of the dry composition comprises fly ash.

16. The process according to claim 1, wherein the content of the at least one silicone oil of formula (I) is 0.05 to 1% by weight of the composition.

17. The process according to claim 1, wherein the content of the at least one silicone oil of formula (I) is 0.2 to 0.7% by weight of the composition.

18. The process according to claim 1, wherein in formula (I), m represents a number ranging from 1 to 10, and n represents a number ranging from 1 to 10.

19. A dry composition comprising at least one binder and at least one silicone oil with the following formula (I):

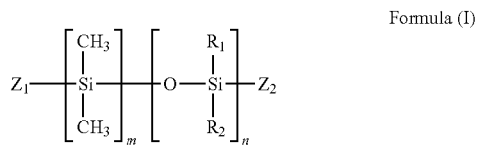

Formula (I)

in which:
- $Z_1$ and $Z_2$, identical or different, independently represent a terminal group selected from the group consisting of a hydrogen atom; a hydroxyl; a linear or branched, optionally substituted $C_1$ to $C_{12}$ alkyl; a linear or branched, optionally substituted $C_2$ to $C_{12}$ alkenyl radical; a linear or branched, optionally substituted $C_1$ to $C_{12}$ heteroalkyl; an optionally substituted $C_5$ to $C_{10}$ cycloalkyl radical; and an optionally substituted $C_6$ to $C_{18}$ aryl radical;
- $R_1$ and $R_2$, identical or different, independently represent a hydroxyl; a linear or branched, optionally substituted $C_1$ to $C_{12}$ alkyl; a linear or branched, optionally substituted $C_2$ to $C_{12}$ alkenyl radical; a linear or branched, optionally substituted $C_1$ to $C_{12}$ heteroalkyl; an optionally substituted $C_5$ to $C_{10}$ cycloalkyl radical; or an optionally substituted $C_6$ to $C_{18}$ aryl radical;
- m and n, identical or different, independently represent a number ranging from 1 to 100,
- wherein the content of the at least one silicone oil of formula (I) is 0.05 to 5% by weight of the composition.

20. The dry composition according to claim 19, wherein the content of the at least one silicone oil of formula (I) is 0.05 to 1% by weight of the composition.

21. The dry composition according to claim 19, wherein the content of the at least one silicone oil of formula (I) is 0.2 to 0.7% by weight of the composition.

22. The dry composition according to claim 19, wherein in formula (I), m represents a number ranging from 1 to 10, and n represents a number ranging from 1 to 10.

* * * * *